United States Patent
Kato et al.

(10) Patent No.: US 8,478,274 B2
(45) Date of Patent: Jul. 2, 2013

(54) HANDOVER CONTROL APPARATUS, MOBILE COMMUNICATION SYSTEM, AND HANDOVER METHOD

(75) Inventors: Yasuhiro Kato, Yokohama (JP); Hideaki Takahashi, Yokohama (JP); Wuri Andarmawanti Hapsari, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 943 days.

(21) Appl. No.: 11/995,075

(22) PCT Filed: Jul. 4, 2006

(86) PCT No.: PCT/JP2006/313323
§ 371 (c)(1),
(2), (4) Date: Feb. 17, 2009

(87) PCT Pub. No.: WO2007/007593
PCT Pub. Date: Jan. 18, 2007

(65) Prior Publication Data
US 2009/0305704 A1 Dec. 10, 2009

(30) Foreign Application Priority Data
Jul. 8, 2005 (JP) .................. 2005-200550

(51) Int. Cl.
*H04W 36/00* (2009.01)
(52) U.S. Cl.
USPC ........................ 455/437; 370/331; 455/436
(58) Field of Classification Search
USPC .................................. 455/436–442
See application file for complete search history.

(56) References Cited

U.S. PATENT DOCUMENTS

| | | | |
|---|---|---|---|
| 6,504,828 B1 | 1/2003 | Corbett | |
| 6,553,015 B1 | 4/2003 | Sato | |
| 6,647,262 B1 | 11/2003 | Demetrescu et al. | |
| 2004/0218575 A1 | 11/2004 | Ibe et al. | |
| 2008/0268844 A1* | 10/2008 | Ma et al. | 455/436 |

FOREIGN PATENT DOCUMENTS

| | | |
|---|---|---|
| CN | 1357207 A | 7/2002 |
| EP | 1081969 A1 | 3/2001 |
| JP | 8-242483 | 9/1996 |
| JP | 2002-112306 | 4/2002 |
| JP | 2003-9209 A | 1/2003 |
| JP | 2004-140674 A | 5/2004 |
| JP | 2005-27119 | 1/2005 |
| KR | 20010030205 A | 4/2001 |
| TW | 477132 B | 2/2002 |
| WO | 00/60895 A1 | 10/2000 |

OTHER PUBLICATIONS

Taiwanese Office Action for Application No. 095124644, mailed on Oct. 29, 2009 (7 pages).

(Continued)

*Primary Examiner* — Kashif Siddiqui
(74) *Attorney, Agent, or Firm* — Osha Liang LLP

(57) ABSTRACT

A handover control apparatus includes a service determination unit determining a type of a service being communicated with by a mobile station and a handover processing unit performing handover in accordance with either a network initiative type handover procedure or a mobile station initiative type handover procedure based on the determination. If the service being communicated with by the mobile station belongs to a communication quality guaranteed type service, the handover is performed in accordance with the network initiative type handover procedure.

5 Claims, 7 Drawing Sheets

OTHER PUBLICATIONS esp@cenet Patent Abstract for Taiwanese Publication No. 477132, publication date Feb. 21, 2002. (1 page).
Chinese Office Action for Application No. 200680024708.4, mailed on Feb. 11, 2011 (12 pages).
International Search Report (iJapanese and English) for PCT/JP2006/313323 mailed Oct. 3, 2006 (9 pages).
Written Opinion of International Searching Authority (Japanese only) for PCT/JP2006/313323 mailed Oct. 3, 2006 (4 pages).
Office Action for Korean Application No. 10-2008-7001395 dated Aug. 31, 2012, with English translation thereof (7 pages).
Extended European Search Report for Application No. 06767840.9, mailed on Mar. 30, 2012 (8 pages).

* cited by examiner

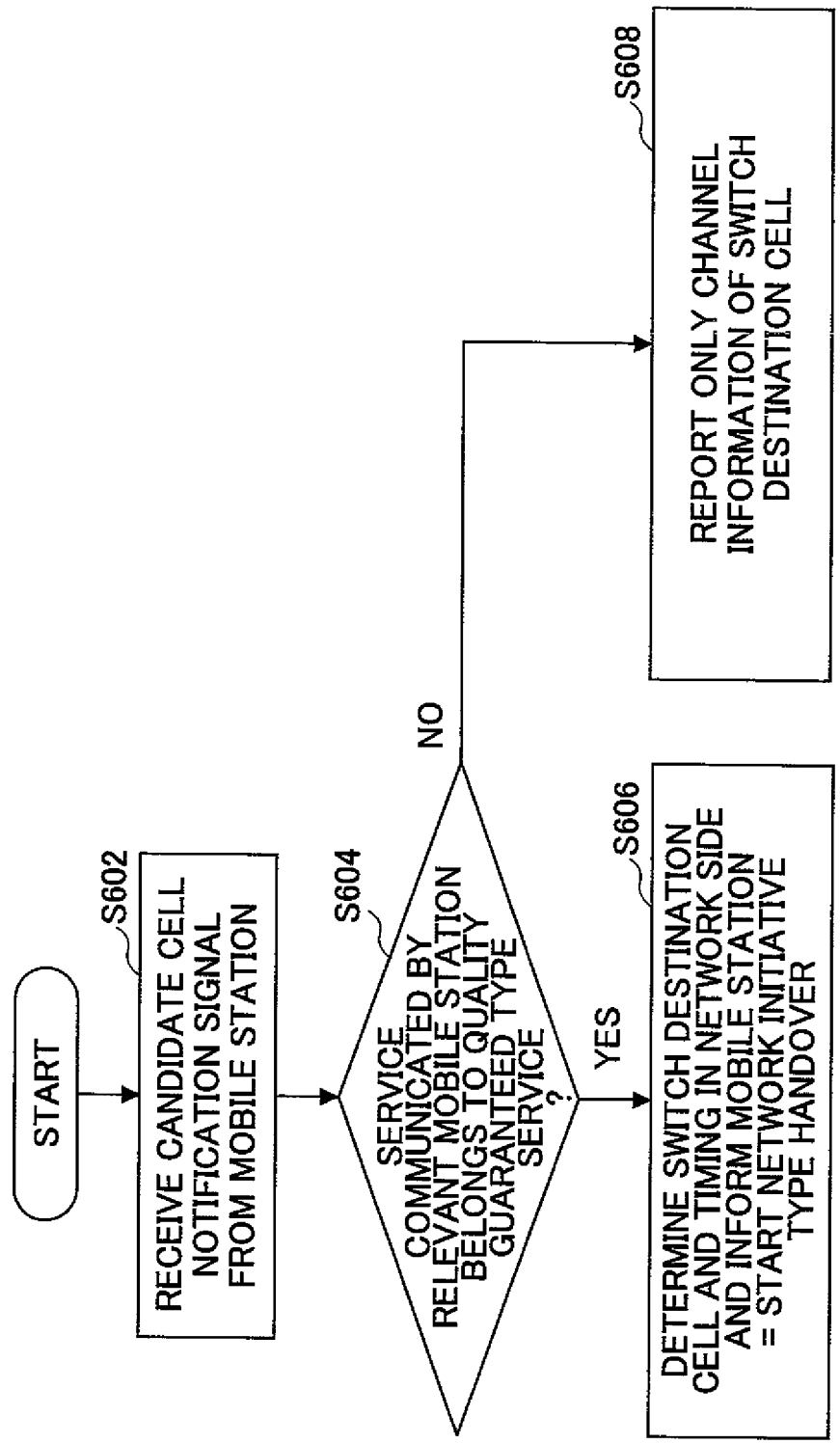

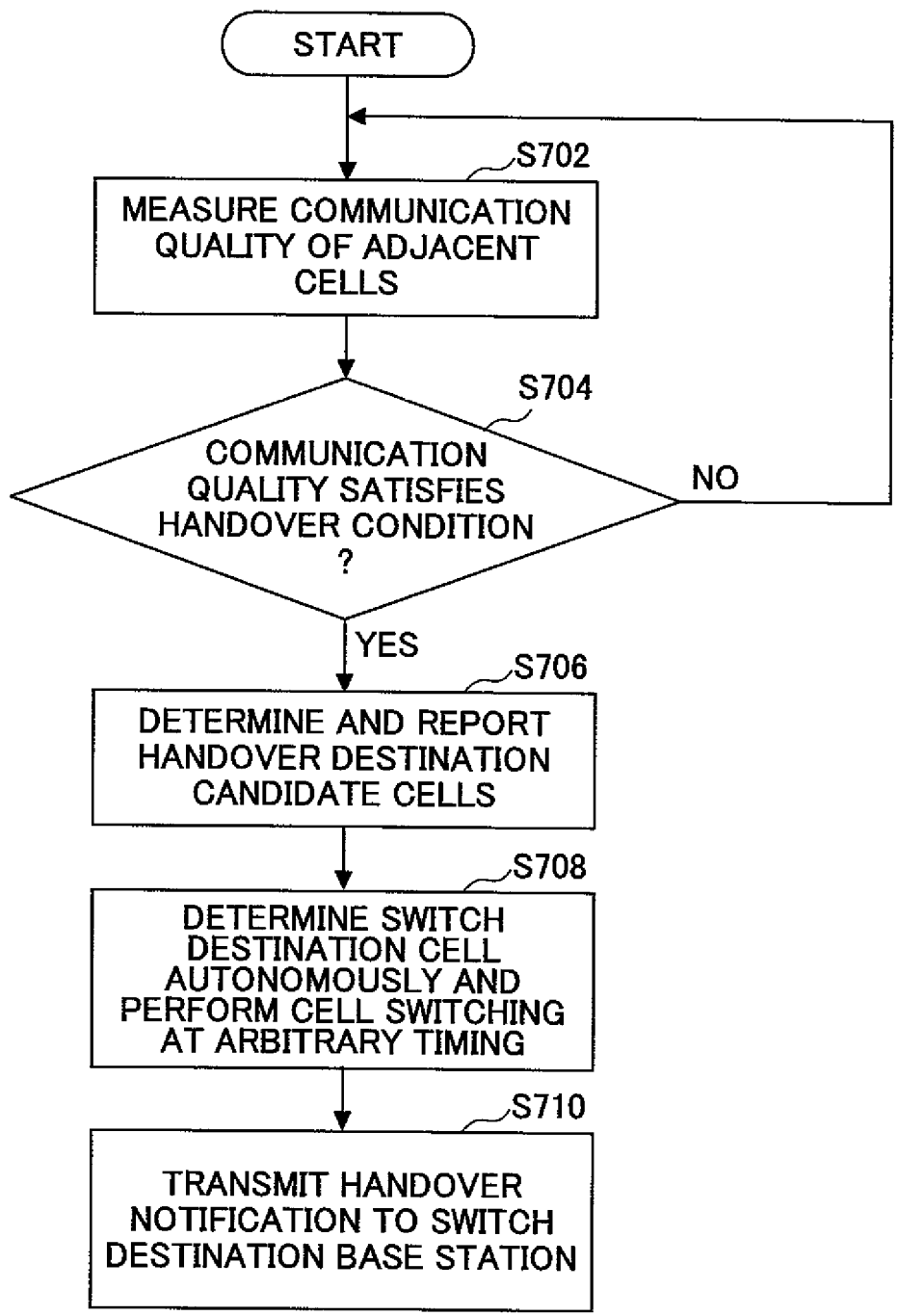

HANDOVER CONTROL APPARATUS, MOBILE COMMUNICATION SYSTEM, AND HANDOVER METHOD

TECHNICAL FIELD

The present invention relates to a handover control apparatus, a mobile communication system and a handover method in a mobile communication system that provide a mixture of different services including a communication quality guaranteed type service and a non-guaranteed type service.

BACKGROUND ART

Handover techniques may include a mobile station initiative type handover and a network initiative type handover widely adopted in cellar systems such as PDC and IMT-2000.

The network initiative type handover is a handover scheme in which a mobile station side is caused to measure the reception level and the reception quality of neighboring cells and to report information regarding switch destination candidate cells as a control signal to the network side. The network initiative type handover is based on a so-called "mobile station assist type handover".

In response to receipt of the control signal, the network side determines a switch destination cell in consideration of information possessed in the network side such as the status of radio resource utilization of the switch destination candidate cells. Also, after a switch ready instruction is issued to a base station covering the switch destination cell, the network side informs the mobile station of the switch destination cell and performs a handover operation. This handover is generally used for cell switching of a communication channel required to maintain the communication quality.

The network initiative type handover is characterized in that the mobile station side selects switch destination candidates whereas the network side determines the final switch destination and in that the cell switching in the mobile station side can be carried out at the same timing as the switching of a transmission route in the network side. As a result, more reliable and faster handover toward the optimal cell can be achieved.

However, the network initiative type handover has some disadvantages in that numerous control steps may be required and that some additional control statuses such as a signal waiting status may have to be provided. In particular, if a mobile station has not been successfully handed over to a designated switch destination cell, some complicated operations may have to be carried out to address this case. The network side performs the route switching for user data independent of the fact that the mobile station side successfully has captured the radio wave for the handover destination cell. Thus, if the handover fails, their statuses do not coincide with each other, and some operation for reverting the above operations must be conducted.

Here, if a proper area configuration is designed, the handover failing has a lower probability. However, the handover may still fail with a certain probability due to some unavoidable difficulties such as temporary out-of-service in an area edge and a tunnel. Thus, such situations have to be taken into consideration.

On the other hand, the mobile station initiative type handover is a handover scheme in which a mobile station autonomously determines the switch destination cell based on the reception level and/or the reception quality of several adjacent cells and performs a handover operation at an arbitrary timing.

According to the mobile station initiative type handover, some control steps can be combined for the purpose of shorter radio synchronization times in such a manner that switch destination candidate cells are reported to the network side in advance and information regarding a channel for the switch destination cell is received from the network side. Unlike the network initiative type handover, however, control steps such as reservation of radio resources and setting of the switching timing are not required in the network side.

The mobile station type initiative type handover is mainly used in cell switching under the communication status in a common channel or in reconnection in the case of failure of the network initiative type handover.

The mobile station initiative type handover is characterized in that since a transmission route is changed after completion of both the autonomous cell switching in the mobile station side and the cell switching in the network side, the overall control can be simplified. Even if the mobile station side cannot successfully capture the radio wave from the initially determined cell, the control of the network side can be initiated without influence of the operation of the network side after successful retry in any cell.

However, since the mobile station autonomously performs the cell switching, the handover cannot be fulfilled in consideration of information possessed in the network side such as the status of radio resource utilization. In particular, the mobile station initiative type handover may not be suitable for voice service and video telephony service in which radio resources are required to maintain a certain communication quality. In addition, the route switching of user data is performed after completion of the handover is confirmed through a control signal, resulting in temporary increase in transmission delay.

DISCLOSURE OF INVENTION

Problem to be Solved by the Invention

However, the above-mentioned prior art may have some problems as presented below.

If the network initiative type handover is applied to a communication channel, a large number of operational steps are required. In particular, some complicated operations may be required for the case where the radio wave has not been properly captured in the switch destination cell.

On the other hand, if the mobile station initiative type handover is applied to a communication channel, the control can be simplified, but some event may arise to make the quality unsatisfied due to insufficient radio resources. Also, the mobile station initiative type handover may have a larger delay during the handover than the network initiative type handover.

Thus, one object of the present invention is to provide a handover control apparatus, a mobile communication system and a handover method that can reduce the control workload in the handover while maintaining the communication quality required by separate services.

Means for Solving the Problem

In order to eliminate the above-mentioned objects, according to one feature of the present invention, a handover control apparatus in a mobile communication system for providing a mixture of multiple different services including a communication quality guaranteed type service and a non-guaranteed type service, includes: a service determination unit determining a type of a service being communicated with by a mobile station; and a handover processing unit performing handover in accordance with either a network initiative type handover procedure or a mobile station initiative type handover procedure based on the determination.

According to this arrangement, the network initiative type handover and the mobile station initiative type handover can be selectively used depending on services during communications.

In another feature of the present invention, a mobile communication system provides a mixture of multiple different services including a communication quality guaranteed type service and a non-guaranteed type service, the system including a mobile station and a radio base station, the mobile station comprising a communication quality measurement unit measuring communication quality of adjacent cells; a handover unit determining whether to perform handover based on the communication quality; and a mobile station side handover processing unit performing a handover operation based on the determination; and the radio base station comprising a service determination unit determining a type of service being communicated with by the mobile station based on the determination of the handover unit; and a base station side handover processing unit performing handover in accordance with either network initiative type handover or mobile station initiative type handover based on the determination of the service determination unit.

According to this arrangement, the control workload can be reduced while maintaining the communications quality required by different services.

In another feature of the present invention, a handover method for use in a mobile communication system for providing a mixture of multiple different services includes a communication quality guaranteed type service and a non-guaranteed type service, the system comprising a mobile station and a radio base station, the method including the steps of: determining a type of a service being communicated with by the mobile station; and performing handover in accordance with either a network initiative type handover procedure or a mobile station initiative type handover procedure based on the determination.

According to this arrangement, the network initiative type handover and the mobile station initiative type handover can be selectively used depending on services during communications.

ADVANTAGE OF THE INVENTION

According to the embodiments of the present invention, a handover control apparatus, a mobile communication system and a handover method can reduce the control workload in the handover while maintaining the communication quality required by separate services.

BRIEF DESCRIPTION OF DRAWINGS

FIG. 6 is a flowchart illustrating an operation of a handover control apparatus according to one embodiment of the present invention; and FIG. 7 is a flowchart illustrating an operation of a mobile station according to one embodiment of the present invention.

LIST OF REFERENCE SYMBOLS

Figure 1:
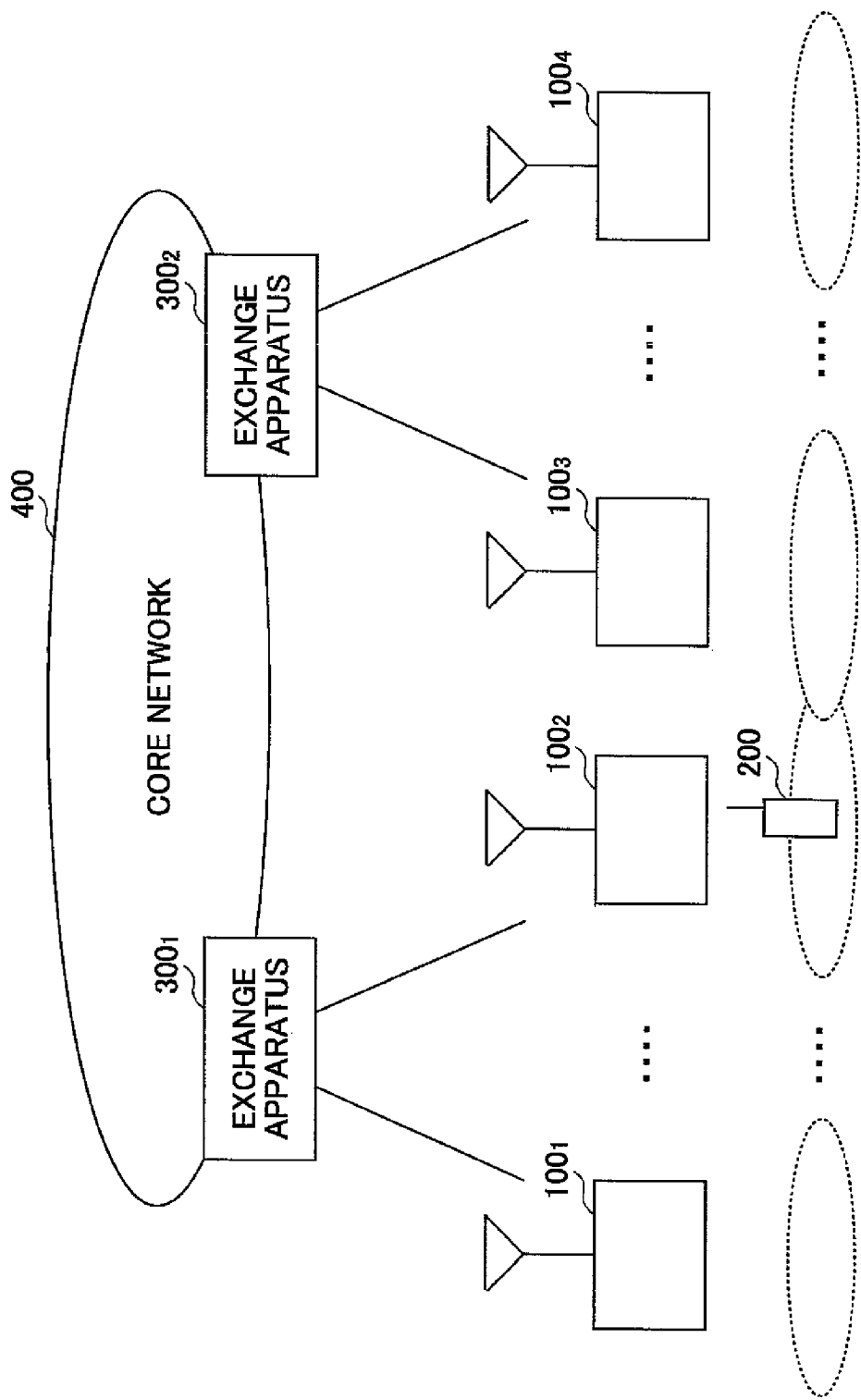
FIG. 1 is a schematic diagram illustrating a mobile communication system according to one embodiment of the present invention.

100, $100_1$, $100_2$, $100_3$, $100_4$: radio communication apparatus
200: mobile station
300, $300_1$, $300_2$: exchange apparatus
400: core network
500: handover control apparatus

BEST MODE FOR CARRYING OUT THE INVENTION

Embodiments of the present invention will be described with reference to the drawings. Throughout the drawings, the same reference symbols may used for objects having the same function, and descriptions thereof will be omitted.

A mobile communication system according to an embodiment of the present invention will be described with reference to FIG. 1.

In this embodiment, the mobile communication system provides a mixture of several different services including communication quality guaranteed type services and non-guaranteed type services. The communication quality guaranteed type service means a service, which is typically a voice service, where a certain transmission rate or a certain transmission delay time is guaranteed. The non-guaranteed type service means a service, which is typically a web service, where a certain transmission rate or a certain transmission delay time is not guaranteed. The mobile communication system includes one or more exchange apparatuses 300 ($300_1$, $300_2$) connected to a core network 400, one or more radio base stations 100 ($100_1$, $100_2$, $100_3$, $100_4$) connected to the exchange apparatuses 300, and one or more mobile stations 200 enabled with radio communications to the radio base stations 100.

As illustrated in FIG. 1, for example, the radio base stations $100_1$ and $100_2$ are connected to the exchange apparatus $300_1$, and the radio base stations $100_3$ and $100_4$ are connected to the exchange apparatus $300_2$.

The radio base station 100 ($100_1$, $100_2$, $100_3$, $100_4$) includes a protocol conversion unit for protocol conversion between wired and wireless communications for each layer and a radio control apparatus for radio control. The radio control apparatus may be implemented as a handover control apparatus as described below. The radio control apparatus may serve to establish and maintain a radio link to a mobile station or control some operations such as handover.

The mobile station 200 terminates all layers from the physical layer to the application layer. The mobile station 200 includes a radio control unit. The radio control unit establishes and maintains a radio link to the radio base station 100 or controls some operations such as handover.

The exchange apparatus 300 sets a transmission route and forwards data. In response to receipt of an instruction from the radio base station 100, the exchange apparatus 300 switches the transmission route. The exchange apparatus 300 may be configured as an ATM exchange apparatus and an IP exchange apparatus, for example, regardless of how to switch data.

The core network 400 includes a home location register (HLR) for storing subscriber information and exchange apparatuses connected to other networks.

In this embodiment, the radio control apparatus serving as a handover control apparatus is installed within the radio base station. However, the radio control apparatus may be installed in a radio control station by defining the radio control station differently, and the description thereof is similar to this embodiment.

Figure 2:
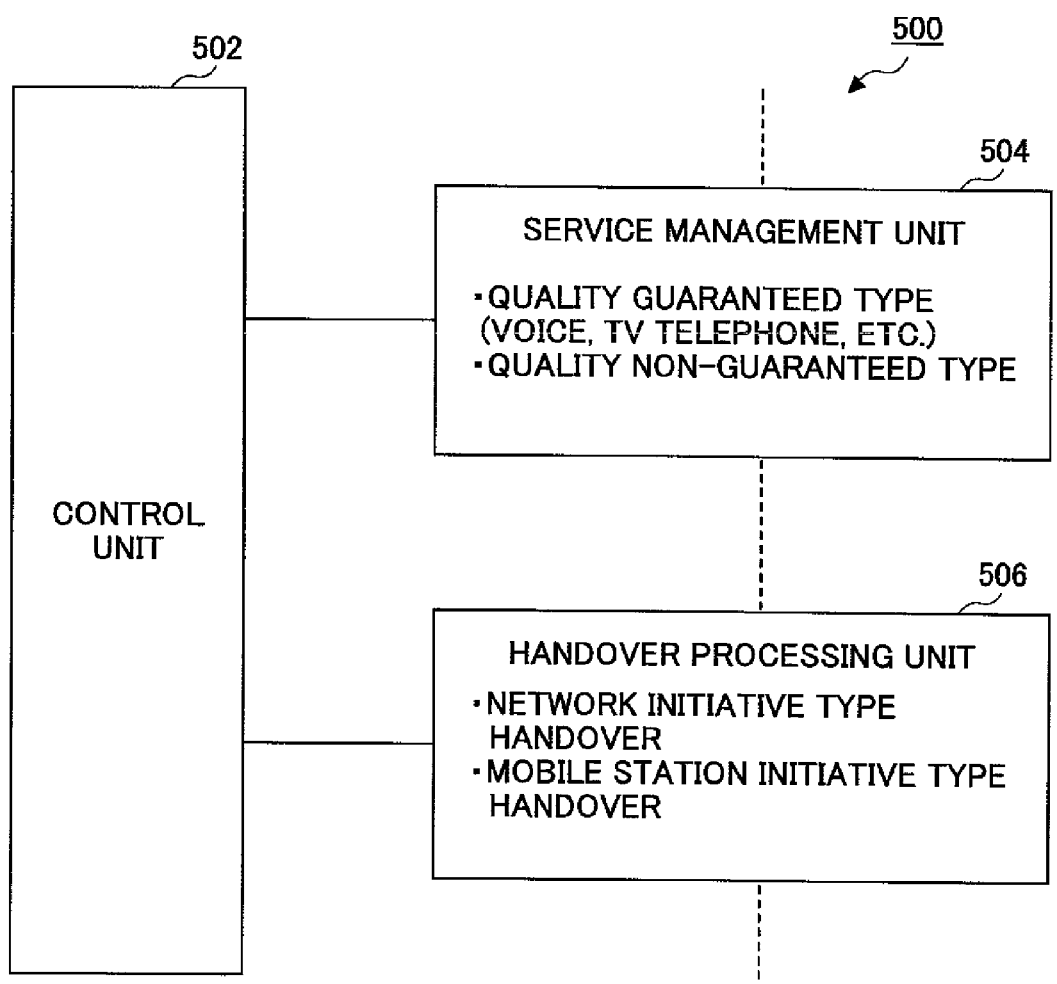
FIG. 2 is a block diagram illustrating a handover control apparatus according to one embodiment of the present invention.

Next, a radio control apparatus 500 in the radio base station 100 according to this embodiment will be described with reference to FIG. 2.

The radio control apparatus 500 includes all radio control functions required for communications with the mobile station 200.

The radio control apparatus 500 includes a control unit 502, a service management unit 504 connected to the control unit 502 and serving as a service determination means, and a handover processing unit 506 serving as a base station side handover processing means and a handover processing means.

The service management unit 504 supervises services under communication and manages the type of individual services, that is, whether the services belong to the quality guaranteed type or the quality non-guaranteed type. For example, if the mobile station 200 informs the radio base station 100 of a switch destination candidate cell determined based on the evaluated quality of adjacent cells, the service management unit 504 determines whether the mobile station 200 is under communication. Specifically, the service management unit 504 determines whether the service being communicated with by the mobile station 200 belongs to the communication quality guaranteed type service. The communication quality guaranteed type service may include a voice service and a TV telephony service.

The handover processing unit 506 performs handover operations. The handover processing unit 506 has two types of procedures as handover functions under communication, a network initiative type procedure and a mobile station initiative type procedure. The network initiative type handover procedure is a handover operation where the network side makes ready in advance. For example, the network side may determine a handover destination and set mobile station information to a handover destination base station in advance. On the other hand, the mobile station initiative type handover procedure is a handover operation where a mobile station autonomously determines a handover destination base station and resets the mobile station information or switches the route after the handover. For example, if the service management unit 504 determines that the service being communicated with by the mobile station 200 belongs to the communication quality guaranteed type service, the handover processing unit 506 performs the network initiative type handover and otherwise performs the mobile station initiative type handover.

In this embodiment, as stated above, the network initiative type handover is the handover where the network side determines the switch destination cell and the switching timing and sets a radio channel or the route switching in advance. On the other hand, as stated above, the mobile station initiative type handover is the handover where the mobile station side determines the switch destination cell and the switching timing and sets the route switching after the mobile station autonomously switches the cell.

The control unit 502 controls the service management unit 504 and the handover processing unit 506.

Figure 3:
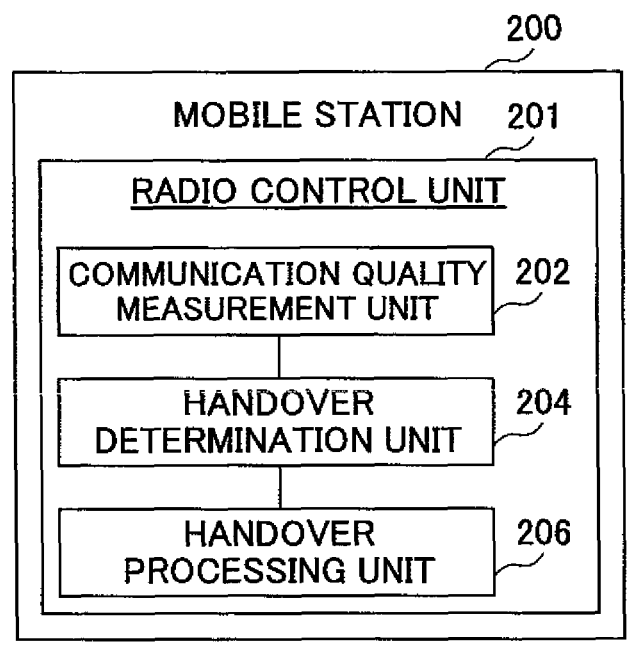
FIG. 3 is a block diagram illustrating a mobile station according to one embodiment of the present invention.

Next, the mobile station 200 according to this embodiment will be described with reference to FIG. 3.

In this embodiment, the mobile station 200 includes a radio control unit 201 as stated above. The radio control unit 201 includes a communication quality measurement unit 202, a handover determination unit 204 connected to the communication quality measurement unit 202, and a handover processing unit 206 connected the handover determination unit 204 and serving as a mobile station side handover processing means.

The communication quality measurement unit 202 measures the communication quality of adjacent cells such as the reception level and the reception quality, and supplies the measurement results to the handover determination unit 204.

The handover determination unit 204 determines whether to perform the handover based on the measurement results. For example, the handover determination unit 204 determines whether to perform the handover based on predefined handover conditions, and supplies the result to the handover processing unit 206.

The handover processing unit 206 performs the handover. For example, the handover processing unit 206 switches the cell and establishes a radio link.

Figure 4:
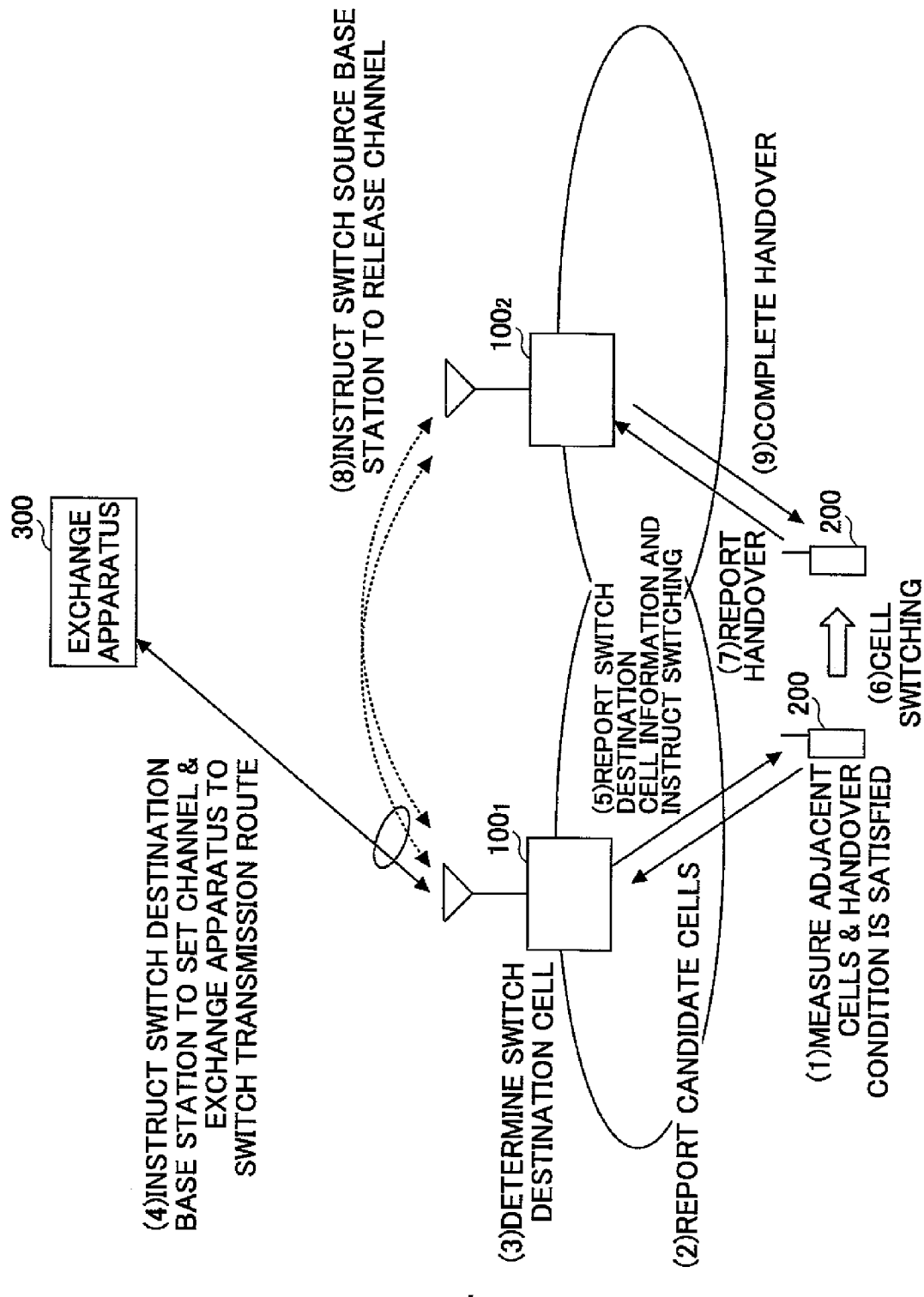
FIG. 4 is a schematic diagram illustrating the network initiative type handover according to one embodiment of the present invention.
Figure 5:
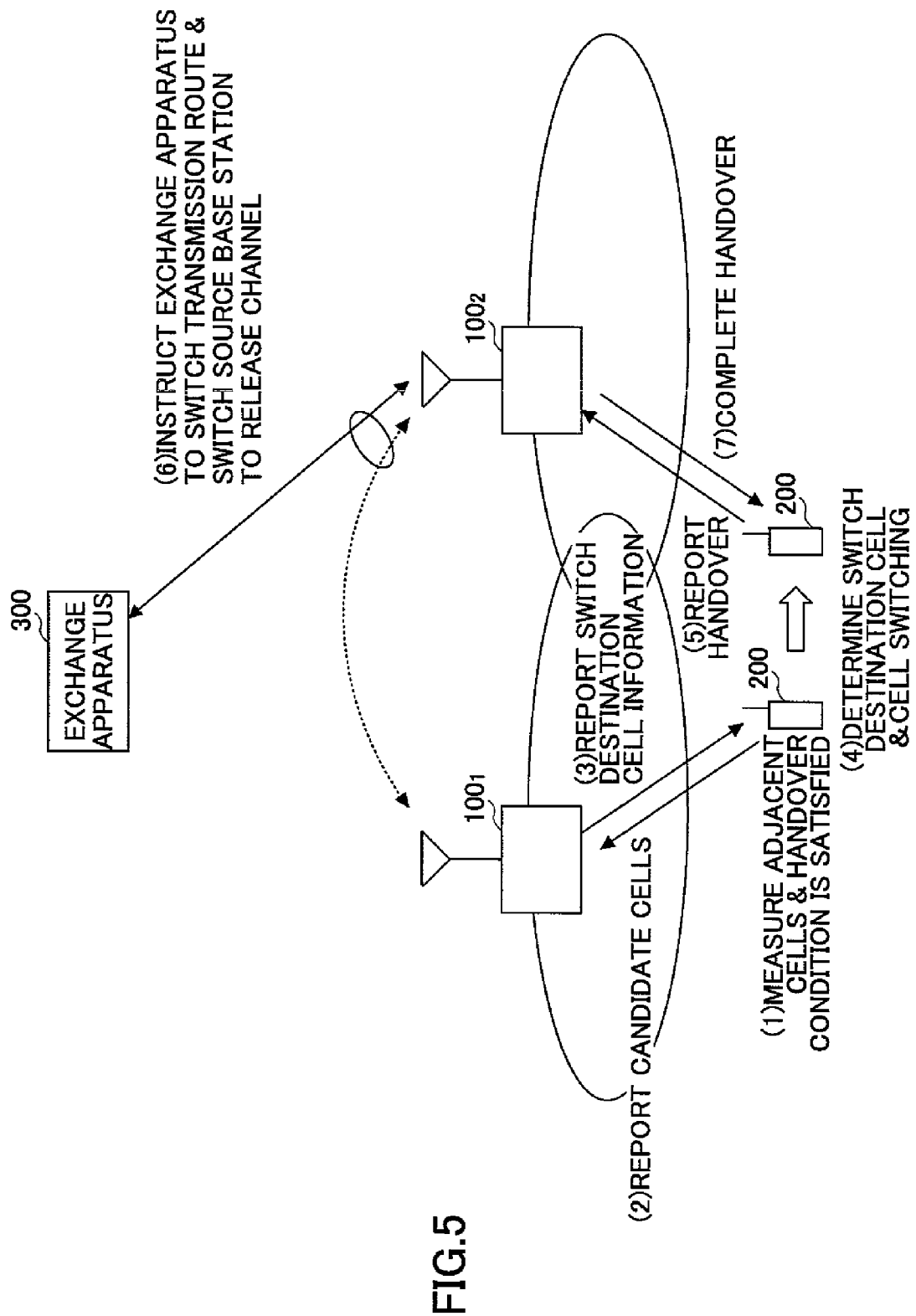
FIG. 5 is a schematic diagram illustrating the mobile station initiative type handover according to one embodiment of the present invention.

Next, a handover operation in the mobile communication system according to this embodiment will be described with reference to FIGS. 4 and 5.

First, a network initiative type handover in a mobile communication system according to this embodiment will be described with reference to FIG. 4. In this embodiment, the case where the mobile station 200 performs handover from the radio base station 100$_1$ to radio base station 100$_2$ will be described.

The communication quality measurement unit 202 of the mobile station 200 measures at least one of the reception level and the reception quality of adjacent cells in accordance with a predefined procedure and supplies the measurement results to the handover determination unit 204. The handover determination unit 204 determines whether the measurement results satisfy a handover condition and supplies the determination results to the handover processing unit 206.

In response to receipt of information indicating that the handover condition is satisfied, the handover processing unit 206 (1) determines one or more handover destination candidate cells and (2) informs the network side of information indicating the determined candidate cells, for example, via a control signal.

In response to receipt of the information indicating the candidate cells, the radio base station 100$_1$ causes the service management unit 504 to determine what service is being communicated with by the mobile station 200 receiving the information indicating the candidate cells. For example, the service management unit 504 of the radio base station 100$_1$ determines whether the service being communicated with by the mobile station 200 belongs to the communication quality guaranteed type service. This determination result is supplied to the handover processing unit 506 via the control unit 502.

If it is determined based on the determination by the service management unit 504 that the service being communicated with by the mobile station 200 belongs to the communication quality guaranteed type service, the handover processing unit 506 (3) determines a switch destination cell in accordance with a predefined procedure based on the degree of congestion of the candidate cells and instructs the radio base station $100_2$ covering the switch destination cell to set a channel. Also, the handover processing unit 506 (4) instructs the exchange apparatus 300 to switch the transmission route.

Then, the handover processing unit 506 of the radio base station $100_1$ (5) validates whether the network side is ready and specifies the switching timing by informing the mobile station 200 of information regarding the switch destination cell.

The handover processing unit 206 of the mobile station 200 (6) performs the cell switching. The handover processing unit 206 of the mobile station 200 (7) transmits a handover notification to the switch destination base station $100_2$ after confirming that a radio link has been established.

The handover processing unit 506 of the switch destination base station $100_2$ (8) instructs the switch source base station $100_1$ to release the channel and (9) transmits the handover completion to the mobile station 200.

In this manner, the whole handover procedure ends.

Some features of the network initiative type handover will be described.

In addition to the reception quality information from the mobile station 200, the switch destination cell may be determined based on information obtained by only the network side such as the degree of congestion. Thus, the switch destination cell can be determined to avoid a cell having a high degree of congestion, that is, a congested cell, and thus the continuous service can be fulfilled in the switch destination cell.

In addition, since the switching timing can be set in the network side, the transmission switching in the exchange apparatus can be carried out at the approximately same as the cell switching in the mobile station. As a result, the handover can be achieved with lesser signal loss and delay.

Next, the mobile station initiative type handover in the mobile communication system according to this embodiment will be described with reference to FIG. 5.

The communication quality measurement unit 202 of the mobile station 200 measures at least one of the reception level and the reception quality of adjacent cells in accordance with a predefined procedure and supplies the measurement results to the handover determination unit 204. The handover determination unit 204 determines whether the measurement results satisfy a handover condition and supplies the determination result to the handover processing unit 206.

In response to receipt of information indicating that the handover condition is satisfied (1), the handover processing unit 206 (2) determines one or more handover destination candidate cells and informs the network side of information indicating the determined candidate cells, for example, via a control signal. Up to this step, the mobile station initiative type handover is similar to the network initiative type handover.

Then, the radio base station 100 (3) informs the mobile station 200, which has informed the radio base station 100 of the information indicating the candidate cells, of channel information regarding the handover destination candidate cells.

According to these steps (1)-(3), in the cell switching by the handover processing unit 206 of the mobile station 200, the procedure of receiving broadcast information of the switch destination cell may be omitted, and thus it is possible to reduce the time required for the cell switching.

Then, the handover processing unit 206 of the mobile station 200 (4) autonomously determines the switch destination cell based on the channel information of the switch destination candidate cells and performs the cell switching at an arbitrary timing.

The handover processing unit 206 (5) transmits a handover notification to the switch destination base station $100_2$ after confirming that a radio link has been established.

The handover processing unit 506 of the radio base station $100_2$ (6) instructs the exchange apparatus 300 to switch the transmission route and the switch source base station $100_1$ to release the channel, and (7) transmits a handover completion to the mobile station 200.

In this manner, the whole handover procedure ends.

In the mobile station initiative type handover according to another embodiment, the steps (1)-(3) may be omitted.

Some feature of the mobile station initiative type handover will be described.

As mentioned above, the mobile station 200 autonomously determines the switching timing and the switch destination cell and switches the transmission route after the cell switching.

Compared with the network initiative type handover where the switch destination candidate cells are determined in advance and the route switching is instructed, the mobile station initiative type handover requires a smaller number of control statuses. In particular, if the handover fails due to the fact that the mobile station 200 cannot capture the radio wave in the switch destination cell properly, no reversion control to cancel the switching is needed, resulting in lesser workload of the control operation.

On the other hand, the mobile station initiative type handover has some disadvantages in that no information possessed by the network side can be taken into account and in that there may be a larger data transmission delay in the handover. However, this type of handover may suffice for best effort type packet services where some communication quality does not have to be guaranteed during communication of the services.

Next, an operation of the radio control apparatus 500 according to this embodiment will be described with reference to FIG. 6.

At step S602, the radio control apparatus 500 receives a candidate cell notification signal from the mobile station 200.

At step S604, the service management unit 504 determines whether the service being communicated with by the relevant mobile station 200 transmitting the candidate cell notification signal belongs to the quality guaranteed type service.

If it is determined that the service being communicated with by the mobile station 200 belongs to the quality guaranteed type service (step S604: YES), the radio control apparatus 500 decides to perform the network initiative type handover and performs the network initiative type handover procedure such as determination of the handover destination cell at step S606. For example, the handover processing unit 506 may inform the mobile station 200 of information indicating the switch destination cell and the transmission timing determined by the network side.

On the other hand, if it is determined that the service communicated by the mobile station 200 does not belong to the quality guaranteed type service (step S604: NO), the radio control apparatus 500 only informs the mobile station 200 of channel information of switch destination candidate cells at step S08.

Then, if the mobile station 200 autonomously performs the handover, the radio control apparatus 500 executes the mobile station initiative type handover procedure.

An operation of the mobile station 200 according to this embodiment will be described with reference to FIG. 7. An exemplary operation of the mobile station 200 in the mobile station initiative type handover will be described below.

At step S702, the communication quality measurement unit 202 measures the communication quality such as the reception level and the reception quality of adjacent cells.

At step S704, the handover determination unit 202 determines based on the measurement results whether the communication quality satisfies a handover condition.

If it is determined that the handover condition is satisfied (step S704: YES), the handover processing unit 206 determines handover destination candidate cells and informs the radio base station of them at step S706. On the other hand, if it is determined that the handover condition is not satisfied (step S704: NO), the control returns to step S702.

Then at step S708, the handover processing unit 206 autonomously determines the switch destination cell and performs the cell switching at an arbitrary timing. In this case, the handover processing unit 206 may autonomously determine the switch destination cell based on the channel information of the switch destination candidate cells reported from the radio base station.

Then at step S708, the handover processing unit 206 transmits a handover notification to the switch destination base station.

In the case of the network initiative type handover, the mobile station 200 performs the cell switching in accordance with the switch destination cell information and the switching timing as reported after completion of the steps S702 through S706. Then, the mobile station 200 transmits the handover notification to the switch destination base station.

According to the embodiments of the present invention, the handover procedures are selectively used depending on the required quality of services under communication. By doing so, if the service belongs to the quality guaranteed type service such as voice services, it is possible to minimize the data loss and the delay caused by the transmission route switching by selecting the optimal switch destination in the network initiative type handover. For the quality non-guaranteed type service such as best effort packet services, since some degree of delay variation is acceptable, the control workload can be reduced through the mobile station initiative type handover. Thus, according to the handover method of this embodiment, it is possible to optimize the quality and the control workload.

INDUSTRIAL APPLICABILITY

The handover control apparatus, the mobile communication system and the handover method according to the present invention can be applied to mobile communication systems.

This international patent application is based on Japanese Priority Application No. 2005-200550 filed on Jul. 8, 2005, the entire contents of which are hereby incorporated by reference.

The invention claimed is:

1. A handover control apparatus in a mobile communication system for providing a mixture of multiple different services including a communication quality guaranteed type service and a communication quality non-guaranteed type service, comprising:
a service determination unit determining which of the communication quality guaranteed type service or the communication quality non-guaranteed type service a mobile station is using in communication; and
a handover processing unit performing handover in accordance with either a network initiative type handover procedure or a mobile station initiative type handover procedure based on the determination,
wherein if the mobile station is using the communication quality guaranteed type service, the handover processing unit performs the handover in accordance with the network initiative type handover procedure, and
if the mobile station is using the communication quality non-guaranteed type service, the handover processing unit performs the handover in accordance with the mobile station initiative type handover procedure, and
wherein the network initiative type handover causes a radio base station to instruct the mobile station to report communication quality of an adjacent cell and determine a handover destination cell and a handover timing based on the reported communication quality, and the mobile station initiative type handover causes the mobile station to measure the communication quality of the adjacent cell and autonomously determine the handover destination cell and the handover timing based on the measured communication quality.

2. A mobile communication system for providing a mixture of multiple different services including a communication quality guaranteed type service and a communication quality non-guaranteed type service, the system comprising a mobile station and a radio base station,
the mobile station comprising:
a communication quality measurement unit measuring communication quality of adjacent cells;
a handover unit determining whether to perform handover based on the communication quality; and
a mobile station side handover processing unit performing a handover operation based on the determination, and
the radio base station comprising:
a service determination unit determining which of the communication quality guaranteed type service or the communication quality non-guaranteed type service the mobile station is using in communication; and
a base station side handover processing unit performing handover in accordance with either network initiative type handover or mobile station initiative type handover based on the determination of the service determination unit,
wherein if the mobile station is using the communication quality guaranteed type service, the base station side handover processing unit performs the handover in accordance with the network initiative type handover, and
if the mobile station is using the communication quality non-guaranteed type service, the base station side handover processing unit performs the handover in accordance with the mobile station initiative type handover, and
wherein the network initiative type handover causes a radio base station to instruct the mobile station to report communication quality of an adjacent cell and determine a handover destination cell and a handover timing based on the reported communication quality, and the mobile station initiative type handover causes the mobile station to measure the communication quality of the adjacent cell and autonomously determine the handover destination cell and the handover timing based on the measured communication quality.

3. The mobile communication system as claimed in claim 2, wherein the base station side handover processing unit determines a switch destination cell of the mobile station and switches a transmission route at a timing identical to a cell switch of the mobile station.

4. The mobile communication system as claimed in claim 3, wherein the base station side handover unit switches a transmission route after a cell switch by the mobile station.

5. A handover method for use in a mobile communication system for providing a mixture of multiple different services including a communication quality guaranteed type service and a communication quality non-guaranteed type service, the system comprising a mobile station and a radio base station, the method comprising the steps of:

determining which of the communication quality guaranteed type service or the communication quality non-guaranteed type service the mobile station is using in communication; and performing handover in accordance with either a network initiative type handover procedure or a mobile station initiative type handover procedure based on the determination, wherein if the mobile station is using the communication quality guaranteed type service, the handover is performed in accordance with the network initiative type handover procedure, and if the mobile station is using the communication quality non-guaranteed type service, the handover is performed in accordance with the mobile station initiative type handover procedure, and wherein the network initiative type handover causes a radio base station to instruct the mobile station to report communication quality of an adjacent cell and determine a handover destination cell and a handover timing based on the reported communication quality, and the mobile station initiative type handover causes the mobile station to measure the communication quality of the adjacent cell and autonomously determine the handover destination cell and the handover timing based on the measured communication quality.

\* \* \* \* \*